United States Patent
Kanitz et al.

(10) Patent No.: US 12,508,671 B2
(45) Date of Patent: Dec. 30, 2025

(54) SYSTEM AND METHOD FOR LASER PROCESSING OF WORKPIECES IN LIQUID

(71) Applicant: LIDROTEC GMBH, Bochum (DE)

(72) Inventors: Alexander Kanitz, Bochum (DE); Jan Stefan Hoppius, Hilden (DE); Jannis Köhler, Schermbeck (DE); Alexander Igelmann, Bochum (DE)

(73) Assignee: LIDROTEC GMBH, Bochum (DE)

( * ) Notice: Subject to any disclaimer, the term of this patent is extended or adjusted under 35 U.S.C. 154(b) by 160 days.

(21) Appl. No.: 18/277,666

(22) PCT Filed: Feb. 24, 2022

(86) PCT No.: PCT/EP2022/054702
§ 371 (c)(1),
(2) Date: Aug. 17, 2023

(87) PCT Pub. No.: WO2022/180178
PCT Pub. Date: Sep. 1, 2022

(65) Prior Publication Data
US 2024/0316695 A1 Sep. 26, 2024

(30) Foreign Application Priority Data
Feb. 25, 2021 (DE) ............. 10 2021 104 475.8

(51) Int. Cl.
*B23K 26/352* (2014.01)
*B23K 26/06* (2014.01)

(52) U.S. Cl.
CPC ........ *B23K 26/352* (2015.10); *B23K 26/0648* (2013.01)

(58) Field of Classification Search
None
See application file for complete search history.

(56) References Cited

U.S. PATENT DOCUMENTS 10,504,783 B2  12/2019  Nomaru et al.
10,940,560 B2  3/2021   Nomaru et al.
(Continued)

FOREIGN PATENT DOCUMENTS

DE  102018218370 A1  5/2019
DE  102018218563 A1  5/2019
(Continued)

OTHER PUBLICATIONS

Sugino JP2019177399A English Translation 2009 (Year: 2009).*

Primary Examiner — Jacob T Minskey
Assistant Examiner — Adrien J Berrnard
(74) Attorney, Agent, or Firm — The Webb Law Firm (57) ABSTRACT

A system for material-ablative laser processing of workpieces in liquid is provided with
a laser beam source for generating pulsed laser radiation;
a focusing unit for focusing the laser radiation onto a workpiece;
and a process chamber for receiving a workpiece. The process chamber includes
a first side having a transparent process window for letting pass laser radiation;
a second side arranged opposite the first side;
a chamber wall surrounding an interior of the process chamber; and
a flow generator for generating a flow within the interior of the process chamber. The flow generator includes a first flow generator unit for generating a first flow along a first flow axis and a second flow generator unit for generating a second flow along a second flow axis; and
a positioning unit for adjusting the position of the laser radiation on the workpiece.

16 Claims, 8 Drawing Sheets

(56) References Cited

U.S. PATENT DOCUMENTS

| | | |
|---|---|---|
| 2005/0259234 A1 | 11/2005 | Hirukawa et al. |
| 2005/0264802 A1 | 12/2005 | Shibata et al. |
| 2009/0003952 A1* | 1/2009 | Schmauder ........ B23K 26/0853 409/183.82 |
| 2010/0214544 A1 | 8/2010 | Sewell et al. |
| 2016/0284547 A1 | 9/2016 | Iguchi et al. |
| 2017/0326688 A1 | 11/2017 | Turner et al. |
| 2019/0131173 A1* | 5/2019 | Nomaru ............. B23K 26/0624 |

FOREIGN PATENT DOCUMENTS

| | | |
|---|---|---|
| JP | 2019177399 A | 10/2019 |
| KR | 1020180002958 A | 1/2018 |

\* cited by examiner

SYSTEM AND METHOD FOR LASER PROCESSING OF WORKPIECES IN LIQUID

CROSS REFERENCE TO RELATED APPLICATION

This application is the national phase of International Patent Application No. PCT/EP2022/054702 filed Feb. 24, 2022 and claims priority to German Patent Application No. 10 2021 104 475.8 filed Feb. 25, 2021, the disclosures of which are hereby incorporated by reference in their entireties.

BACKGROUND OF THE INVENTION

Field of the Invention

The present invention relates to a system for laser processing of workpieces in liquid and a corresponding method.

Description of Related Art

Laser processing systems are known from prior art in various embodiments. In this context, laser processing methods are often divided into material-ablative and material-additive methods. Material-ablative laser processing methods include laser cutting and laser drilling, in particular. Material-additive laser processing methods include, inter alia, Selective Laser Melting (SLM) and Laser Metal Deposition (LMD). The present invention relates to material-ablative laser processing and in particular laser cutting.

In laser processing of workpieces, the laser radiation used is usually focused on the workpiece to be processed by means of a focusing unit. The focused radiation locally heats the workpiece so that material fuses or directly evaporates at the irradiation area of the workpiece using suitable process parameters. By moving the laser radiation along the workpiece surface, either a modification of the workpiece surface or a cutting edge can thereby be generated. The relative movement of the focused laser radiation along the workpiece surface is typically achieved by using a laser scanner configured to redirect the laser radiation. As an alternative, it may be provided that the absolute orientation of the focused laser radiation remains constant and instead the workpiece is advanced using a positioning table.

Furthermore, it is known from prior art to perform the laser processing operation in liquid to improve the process described above. This has the particular advantage that the workpiece is cooled directly by the liquid used, which on the one hand avoids or at least reduces undesirable thermal effects and on the other hand prevents ablated material from getting back onto the surface. In particular, this allows better cutting and surface quality to be achieved. For laser processing in liquids, a process chamber can be used, for example, which is provided to receive the workpiece and the liquid.

However, one problem with the described laser processing in liquid is that micro- and nanoparticles are created during the processing of the workpiece by the ablation process, which particles affect the beam path in an undesirable way. The focused laser radiation is scattered at the created particles, causing the beam profile on the workpiece surface to deviate from the desired profile. In addition, cavitation bubbles often form during processing, leading to additional interference effects.

SUMMARY OF THE INVENTION

Based on the above-described problem, it is an object of the present invention to provide a system for laser processing of workpieces in liquid and a corresponding method for laser processing of workpieces in liquid, which allow improved laser processing of workpieces.

The above-mentioned problem is achieved with the present invention proposing a system for material-ablative laser processing of workpieces in liquid, in particular for laser cutting of workpieces in liquid, comprising
  a laser beam source for generating pulsed laser radiation;
  a focusing unit for focusing the laser radiation onto a workpiece;
  a process chamber for receiving a workpiece, the process chamber comprising:
    a first side having a transparent process window for letting pass laser radiation;
    a second side arranged opposite the first side;
    a chamber wall surrounding an interior of the process chamber; and
    a flow generator for generating a flow within the interior of the process chamber, the flow generator comprising a first flow generator unit for generating a first flow along a first flow axis and a second flow generator unit for generating a second flow along a second flow axis; and
  a positioning unit for adjusting the position of the laser radiation on the workpiece.

The present invention allows particles and cavitation bubbles created during laser processing of workpieces to be effectively removed from the interior of the processing chamber, thereby significantly reducing any interference effects that may arise during processing. In addition, the present invention allows a permanent exchange of the liquid within the process chamber, thereby improving the cooling of the processed workpiece. Furthermore, the present invention allows the adjustment of the flow direction within the process chamber. This is particularly advantageous because the variable flow direction within the process chamber allows specific adaptation of the flow direction to the direction of movement of the laser radiation. Experimental studies have shown that the quality of the cutting edges could be significantly improved if the flow direction is adjusted in such a way that it is orthogonal to the direction of movement of the laser radiation (also referred to as the "writing direction").

The laser radiation used can be ultra-short pulses in particular. Here, the focusing unit is arranged between the laser beam source and the process chamber. The focusing unit is configured to allow the laser radiation to be focused on the workpiece surface. The process window can be made of glass in particular. In this respect, is may be provided to use relatively thin glass to minimize the interactions between the pulsed laser radiation and the process window as much as possible. The positioning unit can be configured either to vary the orientation of the laser radiation and thus the absolute position of the generated laser spot, or to change the absolute position of the workpiece. The chamber wall may be provided to surround the interior of the process chamber in a rectangular or circular shape. The chamber wall can be made of metal in particular. The flow generator unit can particularly be configured to introduce a liquid into the interior of the process chamber or to discharge a liquid from the interior of the process chamber.

The first and second flow axes are particularly provided to form a common angle that is not equal to zero. Furthermore, it may be provided that the flow generator has more than two flow generator units, which are preferably equally spaced along the chamber wall.

For example, it may be provided that a total of four flow generator units are provided, which are arranged around the interior of the process chamber and which are configured to generate flows in four directions.

According to an embodiment of the invention, it may be provided that the chamber wall surrounds the interior of the process chamber in a circular manner and that the process chamber comprises four, six, eight or twelve flow generator units arranged in a circular manner around the interior and configured to generate flows along a first flow axis, a second flow axis, a third flow axis and a fourth flow axis, wherein respective adjacent flow axes form an angle of 90°, 60°, 45° or 30°. In this regard, each flow generator unit may have a separate pump that is provided to introduce liquid into the process chamber or to discharge liquid from the process chamber.

According to an embodiment of the system according to the invention, it may be provided that the first flow axis and the second flow axis together form an angle of 80° to 100°, preferably between 85° and 95°, and particularly preferred of 90°. In this way, depending on the current writing direction of the laser beam, a flow can be generated that is adapted to the writing direction. The flow direction can be adjusted either manually or automatically. Manual flow direction adjustment allows a user to adjust, using a control unit, how the current flow direction must be adjusted to provide a flow that is configured to be substantially orthogonal to the writing direction. As an alternative, the flow direction can be adjusted automatically. For this purpose, it may be provided that the writing direction is automatically detected or defined and adjusts the flow direction depending on the writing direction. Furthermore, it may be provided that the parameters of the writing process are determined in advance. In doing so, the writing path along which the laser radiation moves as well as a flow behavior adapted to the writing path can be defined before the start of the writing process. Although experimental studies show that an orthogonal orientation of the flow direction to the writing direction is preferred, an almost orthogonal orientation can still give better results than, for example, if the flow of the liquid and the writing direction are in the same direction.

According to an embodiment of the present invention, it may be provided that the first flow generator unit and the second flow generator unit comprise a suction pump and/or a pressure pump. Thus, the liquid can be introduced into the interior of the process chamber or discharged from the interior of the process chamber. The flow generator unit may also comprise a liquid inlet channel and/or a liquid outlet channel. The corresponding channels can be designed such that respectively one flow generator unit is configured to generate a flow in one direction. Here, the liquid channels can have a round cross-section or a slit-shaped cross-section, for example.

According to the present invention, it may be provided that the first flow generator unit or the second flow generator unit comprises a suction pump and a pressure pump, wherein the suction pump is arranged on a side of the interior of the process chamber opposite the pressure pump and is particularly configured to discharge liquid from the interior of the process chamber at the same velocity as the liquid is introduced by the pressure pump. This makes it possible to provide a particularly uniform flow within the process chamber. This further improves the writing process by efficiently and uniformly transporting particles and cavitation bubbles created during processing out of the processing volume, while reducing any disruptive turbulence in the interior of the process chamber.

Furthermore, according to the present invention, it may be provided that the second side of the process chamber is of open design. In other words, according to the present embodiment, the second side of the process chamber is not closed off at its second side by a chamber wall or by a chamber floor, respectively. This embodiment of the process chamber is particularly advantageous if relatively large workpieces are to be processed. In conventional process chambers, which are of closed design, the size of the workpieces to be processed is limited by the interior of the process chamber. Due to the open embodiment of the process chamber, the workpiece itself forms a chamber wall adjacent to the interior of the process chamber, wherein the workpiece can also be moved over several decimeters or even several meters, so that particularly large workpieces can be processed due to the constructive design of the process chamber. In addition, this constructional design allows the process chamber to be kept relatively small, which significantly reduces the necessary liquid consumption. It also eliminates the need for relatively thick process windows typically required for large process chambers. This has the additional advantage that the interaction between the pulsed laser radiation and the process window (in particular the absorption and scattering of the laser radiation) is reduced, thereby also reducing any interference effects.

According to a preferred embodiment, it may also be provided that the process chamber comprises a closing flap arranged at the second side and configured to transfer the process chamber from an open state to a closed state. The closing flap can be connected to the process chamber via a hinge, for example. In particular, the closing flap can be pivotally connected to the chamber wall so that the second side of the chamber can be easily and flexibly transferred to an open or closed state. Thus, the process chamber according to the invention allows flexible adaptation to the specific application. In this way, the process chamber is suitable for small as well as for large workpieces. Alternatively, it may be provided, for example, that the closing flap can be moved translationally between an open and a closed position by a sliding mechanism. The closing flap may also have a sealing element that serves to seal the interior of the process chamber. The sealing element can be designed as an O-ring, for example. Furthermore, it may be provided that the closing flap is in the form of a circular disc and the sealing element is in the form of an O-ring, the O-ring being fixed centrally on a surface of the closing flap.

According to a further embodiment of the invention, it may be provided that the second side of the process chamber is of closed design. The closed embodiment of the chamber can be advantageous when small workpieces are to be processed. In a closed process chamber, the workpieces can be easily fixed to the process chamber floor. An additional holder is then not absolutely necessary. In this case, it may be provided that the relative movement of the focused laser beam is performed by deflecting the beam using a laser scanner. In addition, the use of a closed process chamber can reduce water consumption because the amount of liquid flowing out of the chamber can be more easily controlled in the closed embodiment of the process chamber.

According to a further embodiment of the present invention, it may be provided that the positioning unit for adjusting the position of the laser radiation on the workpiece comprises a laser scanner for deflecting the laser radiation and/or a positioning table for positioning the workpiece, wherein the positioning table is particularly configured to position the workpiece in a plane extending radially to the laser beam axis and additionally in a direction extending axially to the laser beam axis. The positioning table can be configured to position the workpiece in a horizontal plane and also in a vertical direction. The advantage of using a laser scanner is that it allows very fast deflection of the focused laser beam, thus enabling very high process speeds. The advantage of using a positioning table is that it also allows the workpiece to be positioned in a direction that is axial to the laser beam axis. This makes it possible, for example, to adjust the focus point or beam waist on the workpiece. This also allows the effective beam diameter on the workpiece to be adjusted and the radiation flux density on the workpiece to be varied.

According to a further embodiment of the invention, it may be provided that the focusing unit comprises a focusing lens, a microscope objective and/or a concave mirror. The focal length of the focusing unit can be selected to focus the laser beam to the desired beam diameter. Furthermore, the focusing unit can be positioned in such a way that the workpiece surface to be processed is located in the focal point of the focusing unit.

It may also be provided that a gas supply device and/or a gas discharge device is provided. The gas supply device makes it possible for the workpiece or the workpiece surface to be processed to be cleaned with a gas in advance or afterwards before the process chamber is filled with liquid. Thus, in an advantageous manner, particles present on the workpiece surface can be removed before the chamber is filled with the liquid or the sample is dried of liquid after the process, respectively.

In addition, it may be provided that the laser beam source for generating a pulsed laser radiation is configured to generate a pulsed laser radiation having a pulse duration of 10 fs to 300 ps, preferably of 100 fs to 200 ps.

According to an embodiment of the present invention, it may be provided that a laser power of 0.2 to 300 W, a repetition rate of 10 kHz to 80 MHz, a wavelength of 258 nm, 266 nm, 344 nm, 355 nm, 515 nm, 532 nm, 1,030 nm, or 1,064 nm, and a writing speed of 0.5 mm/s to 20,000 mm/s are used.

According to an embodiment of the invention a spatial light modulator or diffractive optical element may also be provided, wherein the spatial light modulator or diffractive optical element is configured to provide a plurality of laser beams for parallel laser processing of the workpiece. The spatial light modulator can use a reflective or a translucent spatial light modulator. The spatial light modulator or diffractive optical element, respectively, is located between the laser beam source and the process chamber. By providing a plurality of laser beams, it is advantageously achieved that higher process speeds are made possible.

Furthermore, according to a further embodiment of the invention, a camera system may be provided which is configured to make recordings of the interior of the process chamber. Here, it may be provided that the camera makes recordings through the process window. Thus, the current writing direction of the laser radiation can be detected. This can be done, for example, by detecting the laser beam focus on the surface or by detecting the area on the surface of the workpiece where a particle cloud is generated. The particle cloud resulting from processing can usually be seen with the naked eye and can be reliably detected by a camera. As an alternative, it may also be provided that the camera system comprises two cameras located at two different positions around the interior of the process chamber. For example, it may be provided that the two cameras allow recordings in two directions, the recording directions being orthogonal to each other. The cameras can independently detect the position of the laser beam in one direction. By evaluating the camera recordings, the writing speed can then be determined. Then, the flow direction can be adjusted depending on the detected writing direction. In particular, the flow direction can be adjusted orthogonally to the writing direction.

It may also be provided that the process chamber is configured to provide an operating pressure of 1 to 6 bar, in particular 3 to 4 bar.

Further, to solve the above-mentioned problem, the present invention proposes a process chamber for receiving a workpiece for laser processing in liquid, the process chamber comprising:
  a first side having a transparent process window for letting pass laser radiation;
  a second side arranged opposite the first side;
  a chamber wall surrounding an interior of the process chamber; and
  a flow generator for generating a flow within the interior of the process chamber, the flow generator comprising a first flow generator unit for generating a first flow along a first flow axis and a second flow generator unit for generating a second flow along a second flow axis.

The object described at the beginning is also achieved with the present invention proposing a system for material-ablative laser processing of workpieces in liquid, in particular for laser cutting of workpieces in liquid, comprising
  a laser beam source for generating pulsed laser radiation;
  a focusing unit for focusing the laser radiation onto a workpiece;
  a process chamber for receiving a workpiece, the process chamber comprising:
    a first side having a transparent process window for letting pass laser radiation;
    a second side arranged opposite the first side, wherein the second side is of open design; and
    a chamber wall surrounding an interior of the process chamber; and
  a positioning unit for adjusting the position of the laser radiation on the workpiece.

Furthermore, the above-mentioned object is achieved with a proposed method for material-ablative laser processing of workpieces in liquid, in particular for laser cutting of workpieces in liquid, the method comprising the following steps:
  providing a workpiece in an interior of a process chamber;
  filling the interior of the process chamber with a liquid;
  focusing a pulsed laser radiation onto a surface of the workpiece using a focusing unit;
  generating a relative movement of the focused laser radiation on the workpiece surface using a positioning unit;
  generating a liquid flow within the interior of the process chamber using a flow generator;
  adjusting a flow direction of the liquid flow depending on the relative direction of movement of the focused laser radiation on the surface of the workpiece.

Preferably, the method may additionally provide for the chamber to be flooded with gas after the workpiece has been processed.

The method according to the invention allows efficient removal of micro- and nanoparticles as well as cavitation bubbles and persistent gas bubbles generated during the processing operation. The aforementioned particles and bubbles are efficiently removed from the interior of the process chamber, so that the interference effects resulting from the interaction of the laser radiation with the particles and the bubbles are significantly reduced. In addition, the method according to the invention allows more efficient cooling of the workpiece during laser processing.

According to an embodiment of the method according to the invention, it may be provided that adjusting the flow direction comprises providing a flow direction that is oriented orthogonally to the relative direction of movement of the laser radiation on the workpiece surface. Experimental tests have shown that a flow direction orthogonal to the relative direction of movement of the laser radiation leads to improved quality in laser processing.

According to a further embodiment of the method according to the invention, it may further be provided that the intensity of the generated flow is additionally adjusted as a function of the process parameters. Here, the intensity of the flow can be increased when a relatively high laser power is set, while the intensity of the flow can be reduced when a relatively low laser power is set. In the same way, it may be provided, for example, that in the case of a relatively high writing speed, the intensity of the flow can be reduced. Alternatively or additionally, it may be provided that the flow intensity is reduced when a relatively low writing direction is set. Thus, the generated flow can be optimized depending on the expected amount of particles.

According to a further embodiment of the method according to the invention, it may be provided that the relative movement of the focused laser radiation along the surface of the workpiece takes place at a velocity of 0.6 to 1.4 mm/s, in particular 0.8 to 1.2 mm/s and particularly preferred 1 mm/s. In experimental tests, the cutting quality was investigated as a function of the writing speed. This showed that particularly good cutting edges could be achieved in a specific range of writing speed. The quality of a cut can be evaluated, for example, by the aspect ratio, i.e. the ratio between the cutting depth and the cutting width. The higher the aspect ratio, the better the cutting quality can be evaluated. In experimental studies, in which writing speeds of about 0.1 mm/s to 10 m/s were evaluated, it was shown that the highest aspect ratios could be achieved with a writing speed of about 1 mm/s. Whereas aspect ratios of only 4 to 6 could be achieved at a writing speed of 4 m/s, aspect ratios of up to 15 could be achieved when the writing speed was reduced to a value of 1 mm/s.

In the conducted experiments, particularly high aspect ratios could be achieved when a writing speed of 1 mm/s was used. The experiments used a laser pulse duration of 350 fs, a repetition rate of 200 kHz, a wavelength of 1,030 nm, an average power of 360 mW, an F-theta objective with a focal length of 70 mm, a beam diameter at focus of 10 µm, and a flow velocity of 1.5 m/s.

According to a further embodiment of the method according to the invention, it may be provided that the flow velocity is 1 to 10 m/s, in particular 4 to 6 m/s, and particularly preferred 5 m/s. According to a further alternative embodiment, it may be provided that the flow velocity is 2 to 3 m/s.

Furthermore, according to a further exemplary embodiment of the method according to the invention, the following steps may be provided:
  detecting the direction of relative movement of the laser radiation using a camera system; and
  adjusting a flow direction orthogonal to the detected direction of the relative movement of the laser radiation.

In addition, a control unit may be provided that receives image signals from the camera system and evaluates these image signals. The position of the laser beam on the workpiece surface can be determined from the individual image signals. Thus, by evaluating the image signals, the direction of movement of the laser radiation can be determined. Depending on the determined relative direction of movement of the laser beam, the flow direction can be adjusted. For example, the control unit can be designed as a microcontroller that receives the image signals at an input and provides control signals for controlling the individual flow generator units at an output. In addition, the microcontroller can also be configured to provide the process parameters for the writing process and thereby control the writing process.

BRIEF DESCRIPTION OF THE DRAWINGS

In the following, the present invention is described in more detail with reference to the Figures. In the drawings.

DESCRIPTION OF THE INVENTION

Figure 1:
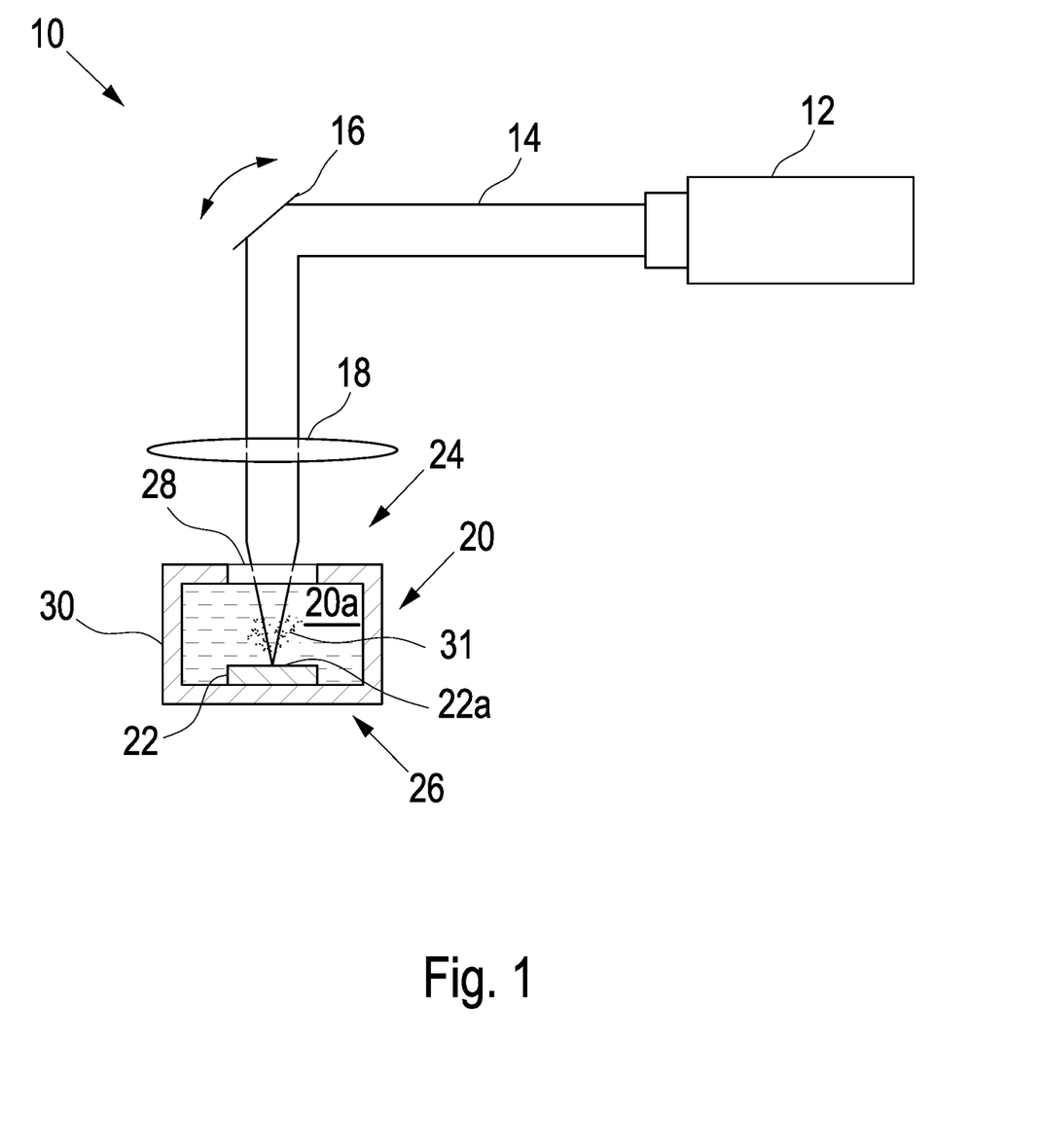
FIG. 1 shows a laser processing system for processing a workpiece in liquid according to prior art.

FIG. 1 shows a system 10 for laser processing of a workpiece 22 in liquid. The system 10 comprises a laser beam source 12 that is particularly configured to generate a pulsed laser radiation 14. The generated laser radiation 14 is deflected by a positioning unit 16. In the exemplary embodiment illustrated in FIG. 1, positioning unit 16 is designed as a laser scanner and provided to position the focused laser beam 14 on the surface of the workpiece. The deflected laser radiation 14 is directed to a focusing unit 18. In the illustrated exemplary embodiment, focusing unit 18 is designed as a converging lens. Alternatively, focusing unit 18 can also be designed as a microscope objective or a concave mirror. The focusing unit 18 focuses laser radiation 14 into a process chamber 20. The process chamber 20 comprises an interior 20a configured to receive workpiece 22. In addition, interior 20a of process chamber 20 is filled with a liquid. The liquid can be water or other liquids. In particular, water can be used for this purpose. The laser radiation 14 is focused by focusing unit 18 onto a surface 22a of workpiece 22. As a result, workpiece surface 22a heats up to temperatures of >1,000° C. causing some of the workpiece material to evaporate. The evaporated material is cooled by the liquid, wherein nano- and microparticles can be formed, which are visible as a particle cloud 31 in the liquid. However, said particle cloud 31 affects the propagation of the focused laser radiation 14. The undesired interaction of laser radiation 14 with particle cloud 31 typically degrades the quality of a laser cut.

The process chamber 20 is typically configured such that it comprises a first side 24 and a second side 26 arranged opposite the first side 24. A process window 28 is recessed on the first side 24 of process chamber 20 so that laser radiation 14 can be directed into the interior of process chamber 20. According to prior art, the second side 26 of process chamber 20 is of closed design so that no liquid can escape from interior 20a of process chamber 20. The interior 20a of process chamber 20 is surrounded by a chamber wall 30.

The disadvantage of the systems 10 known in prior art for laser processing of workpieces 22 in liquid is particularly to be seen in the fact that the particle cloud 31 resulting from processing of workpiece 22 can negatively affect the laser processing operation. Another disadvantage of the previously known systems 10 for laser processing in liquid is that the size of the workpieces 22 that can be processed is limited by the dimensions of process chamber 20. Thus, in practice, it is often not possible to process larger workpieces or larger surfaces, respectively. Therefore, when workpieces 22 of different sizes are to be processed, it is often necessary to provide process chambers of different sizes, but this increases the effort and cost of processing workpieces 22.

Figure 2:
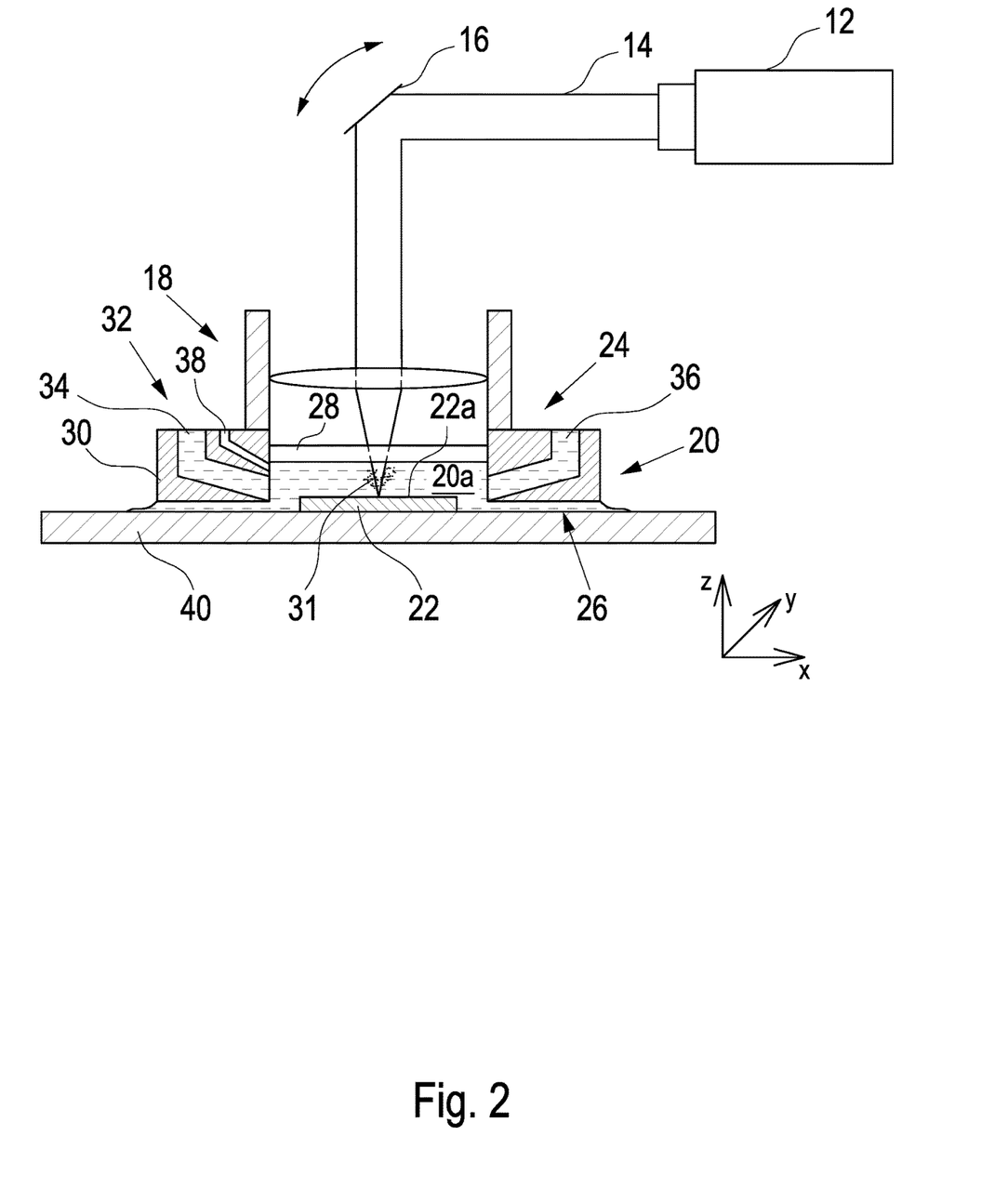
FIG. 2 shows an embodiment of a laser processing system according to the present invention.

FIG. 2 shows an exemplary embodiment of a system for laser processing of a workpiece 22 in liquid according to the present invention. Similar to system 10 described in FIG. 1, the laser processing system 10 according to the invention also comprises a laser beam source 12 for generating a pulsed laser radiation 14, which is directed to a focusing unit 18 via a positioning unit 16, wherein focusing unit 18 focuses laser radiation 14 into a process chamber 20. A workpiece 22 is disposed in interior 20a of process chamber 20, wherein focusing unit 18 is selected and configured to focus laser radiation 14 onto surface 22a of workpiece 22. In system 10 illustrated in FIG. 2, process chamber 20 has a first side 24, wherein a process window 28 is arranged on the first side 24 of process chamber 20, which allows laser radiation 14 to enter interior 20a of process chamber 20. In the exemplary embodiment illustrated here, the second side 26 of process chamber 20 is of open design, unlike system 10 described in FIG. 10. Compared to a closed design of the second side 26 of process chamber 20, this has the advantage that workpieces of any size can be processed due to the open design of chamber 20. The open design of process chamber 20 allows workpiece 22 or a positioning table 40 on which workpiece 22 is positioned to form the bottom of process chamber 20 and close off interior 20a of chamber 20. As a result, process chamber 20 illustrated in FIG. 2 advantageously allows processing of workpieces 22 that are significantly larger than interior 20a of process chamber 20.

In the embodiment of system 10 according to the invention illustrated in FIG. 2, a chamber wall 30 surrounds interior 20a of process chamber 20. The process chamber 20 also comprises a flow generator unit 32. Here, the flow generator unit 32 comprises a pressure pump (not illustrated in FIG. 2) and a liquid inlet channel 34. The liquid inlet channel 34 is formed in chamber wall 30. Moreover, the flow generator unit comprises a suction pump (also now illustrated in FIG. 2) and a liquid outlet channel 36 which is arranged on a side of interior 20a of chamber 20 opposite to liquid inlet channel 34. The flow generator unit 32 is configured to generate a flow along a flow axis. In this exemplary embodiment, the flow axis corresponds to the x-axis illustrated in FIG. 2. The generated flow can effectively remove the particle cloud 31 formed during processing of workpiece surface 22a from interior 20a of process chamber 20. This makes is possible to avoid or at least greatly reduce the interference effects during laser processing caused by particle cloud 31. The flow generator unit 32 can be configured to introduce liquid into process chamber 20 whenever a particle cloud 31 is formed. By using a pressure pump and a suction pump, the liquid introduced into interior 20a of process chamber 20 can be discharged from the opposite side of the process chamber 20 at the same time, thereby adjusting a more uniform flow in interior 20a of process chamber 20. Alternatively, it may also be provided that the flow generator unit comprises only a pressure pump or only a suction pump.

As can be seen from FIG. 2, the embodiment illustrated herein also includes a gas inlet 38 configured to introduce a gas into interior 20a of process chamber 20. In particular, the gas can be introduced into interior 20a at high pressure. As a result, before the laser processing operation begins and/or after the processing operation is completed, surface 22a of workpiece 22 can be cleaned of particles. This allows several process steps to be carried out within one and the same chamber, making the overall processing operation more efficient. In addition, the gas inlet 38 may advantageously be used to dry the processed workpiece after processing is completed. Furthermore, one or more gas outlets may be provided in process chamber 20.

While in the exemplary embodiment illustrated in FIG. 2 positioning unit 16 is designed as a laser scanner configured to position the laser beam on surface 22a of workpiece 22 in the x/y plane, a positioning table 40 configured to position workpiece 22 in particular along the z-axis may alternatively or additionally be provided. This makes it possible, on the one hand, to adjust the focus position of laser beam 14 and, on the other hand, to define the distance between process chamber 20 and positioning table 40. Thus, it can be adjusted whether and how much liquid can escape from process chamber 20 at the second side 26. For example, if it is expected that a relatively large amount of particles will be formed during the laser processing operation, then it may be provided, for example, that the distance between process chamber 20 and positioning table 40 is increased, and that flow generator unit 32 introduces the liquid into interior 20a of process chamber 20 at a relatively high pressure so that a large amount of liquid can be introduced into process chamber 20 and also be discharged in a timely manner. In this way, a particularly efficient removal of particle cloud 31 created in interior 20a is made possible.

Figure 3:
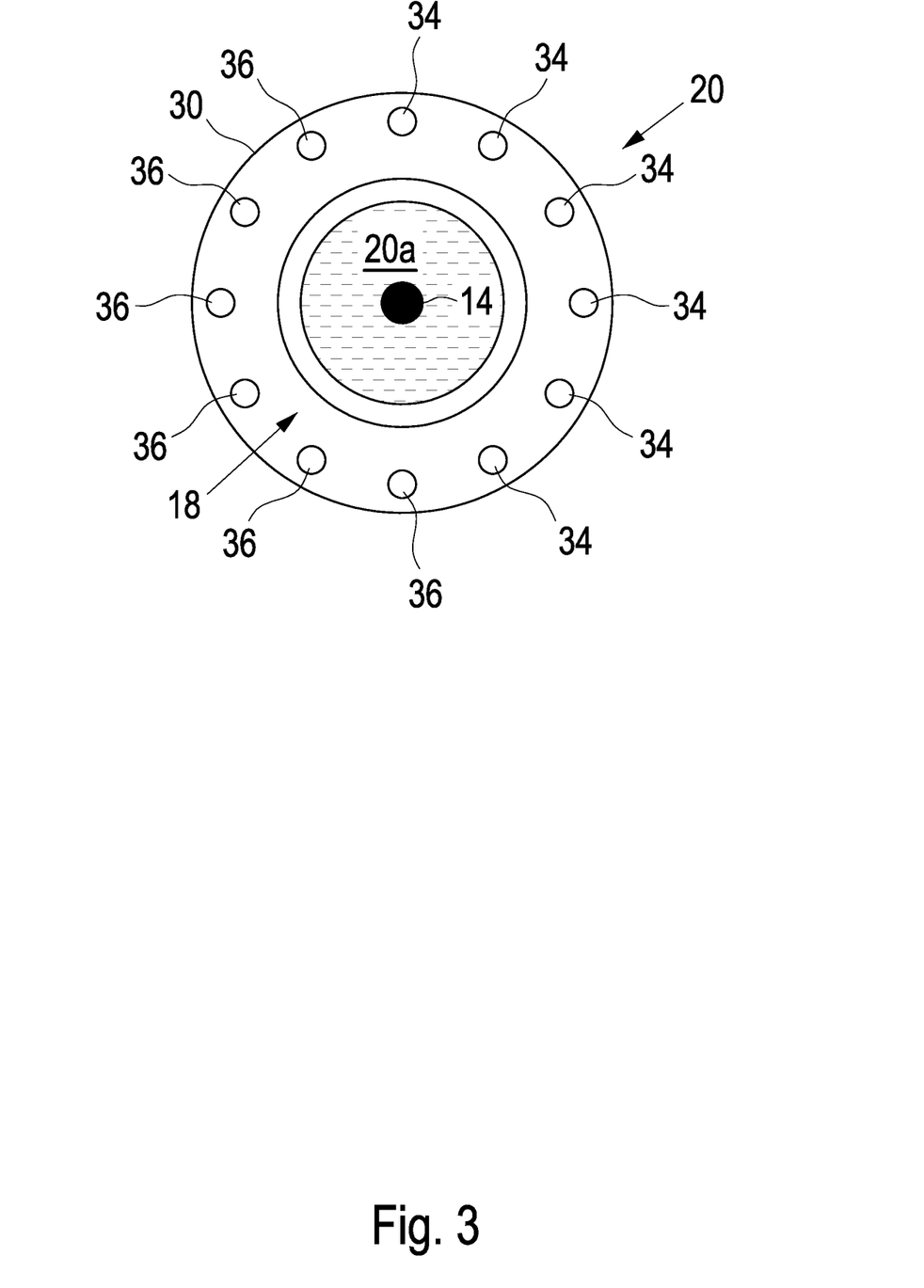
FIG. 3 shows a plan view of an embodiment of the process chamber according to the invention.

FIG. 3 shows a plan view of process chamber 20 illustrated in FIG. 2. As can be seen in this figure, a plurality of flow generator units are provided in the illustrated embodiment of process chamber 20, of which the liquid inlet channels 34 and the liquid outlet channels 36 are respectively illustrated in this figure. In total, six flow generator units are provided in the embodiment of process chamber 20 according to the invention illustrated here, which are configured to generate flows within the process chamber along six flow axes. The flow axes form an angle of 60° with each other. As illustrated in FIG. 2, the liquid inlet channels 34 and liquid outlet channels 36 are each formed in the annular chamber wall 30 and are arranged in a circular way around interior 20a of process chamber 20. The adjustability of the flow in six different directions makes it possible to adjust the flow direction of the liquid as a function of the writing direction, thereby ensuring particularly efficient removal of particle cloud 31 and any cavitation bubbles.

Figure 4:
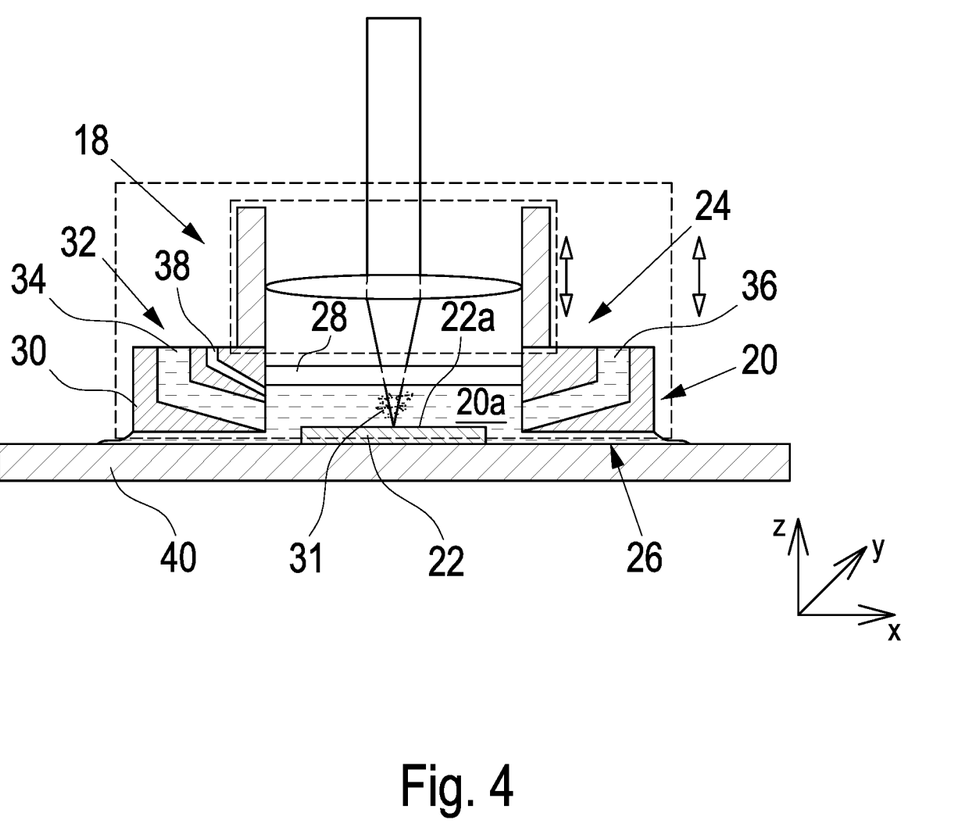
FIG. 4 shows a side view of an embodiment of the process chamber according to the invention.

FIG. 4 shows a further exemplary embodiment of process chamber 20 according to the invention. In the exemplary embodiment illustrated here, focusing unit 18 is designed as a focusing lens that can be positioned along the z-axis. In this way, it is possible to position the focus position of laser radiation 14. This allows the beam diameter to be adjusted on workpiece surface 22a. In addition, in the exemplary embodiment illustrated in FIG. 4, it is provided that process chamber 20 is adapted to be positioned along the z-axis. This allows the position between process chamber 20 and positioning table 40 to be adjusted, so that in this way it is possible to regulate how much liquid can escape from the second side 26 of process chamber 20.

Figure 5:
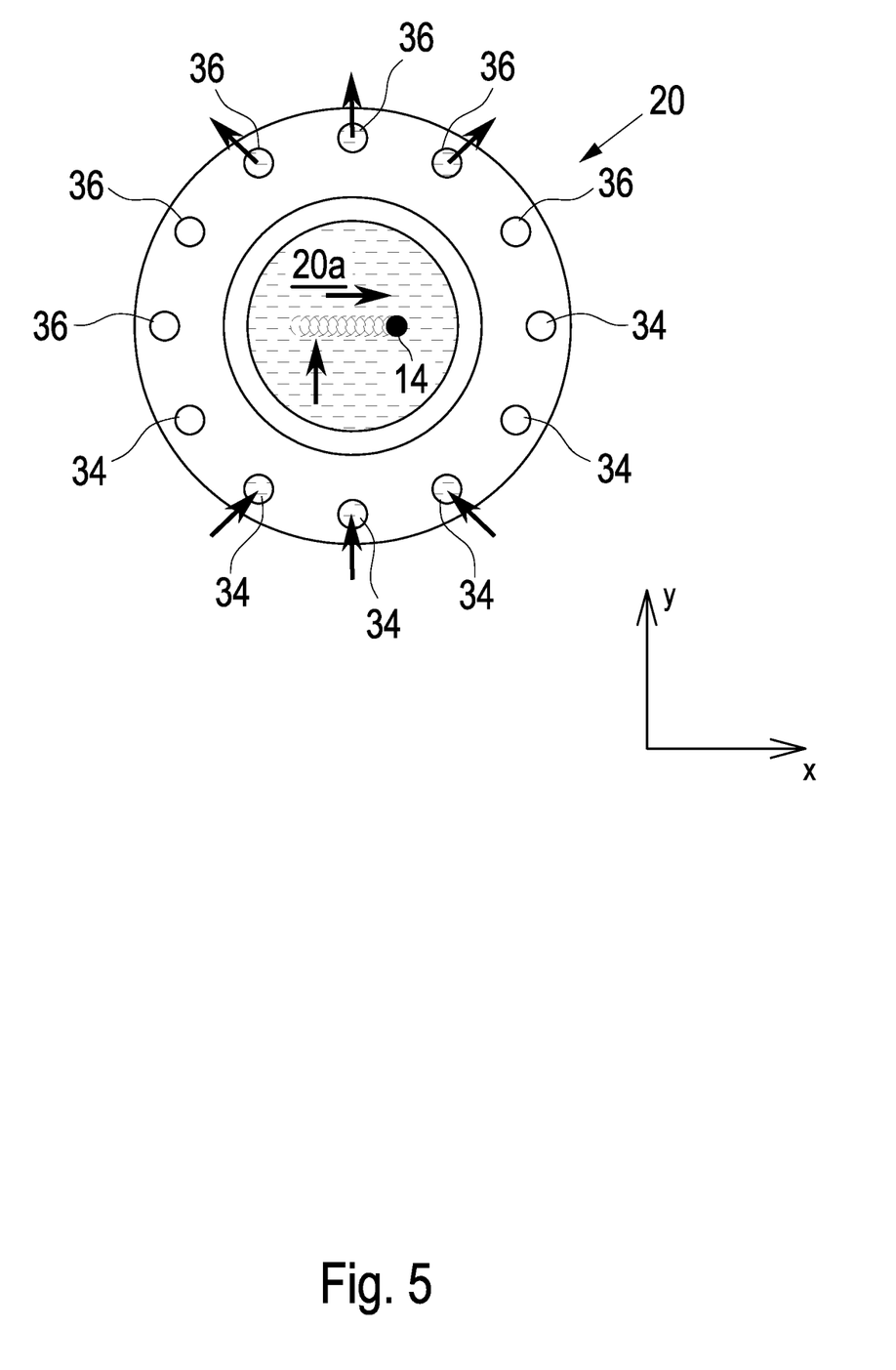
FIG. 5 shows a plan view of the process chamber illustrated in FIG. 4 in a first operating mode.

FIG. 5 shows a plan view of process chamber 20 illustrated in FIG. 4 in a first operating mode. In the laser processing operation illustrated here, the focus of laser radiation 14 is moved along the positive x-axis. To ensure effective removal of the particles created in interior 20a of process chamber 20, the flow generator unit is operated to generate a liquid flow in the direction of the positive y-axis. As shown in this exemplary embodiment, to generate flow in the y-axis direction, the flow generator can generate a plurality of liquid flows provided by a total of three pumps and three liquid inlet channels 34. On the side of interior 20a of process chamber 20 opposite the liquid inlet channels 34, three liquid outlet channels 36 are provided which discharge liquid from interior 20a of process chamber 20 by means of a suction pump. In this way, a liquid flow is created in interior 20a of chamber 20, which liquid flow is oriented orthogonally to the writing direction. The process chamber 20 shown in FIG. 5 illustrates that liquid flows in different directions can be generated in a simple manner, so that a liquid flow direction that is optimal for the respective processing or writing direction can be adjusted.

Figure 6:
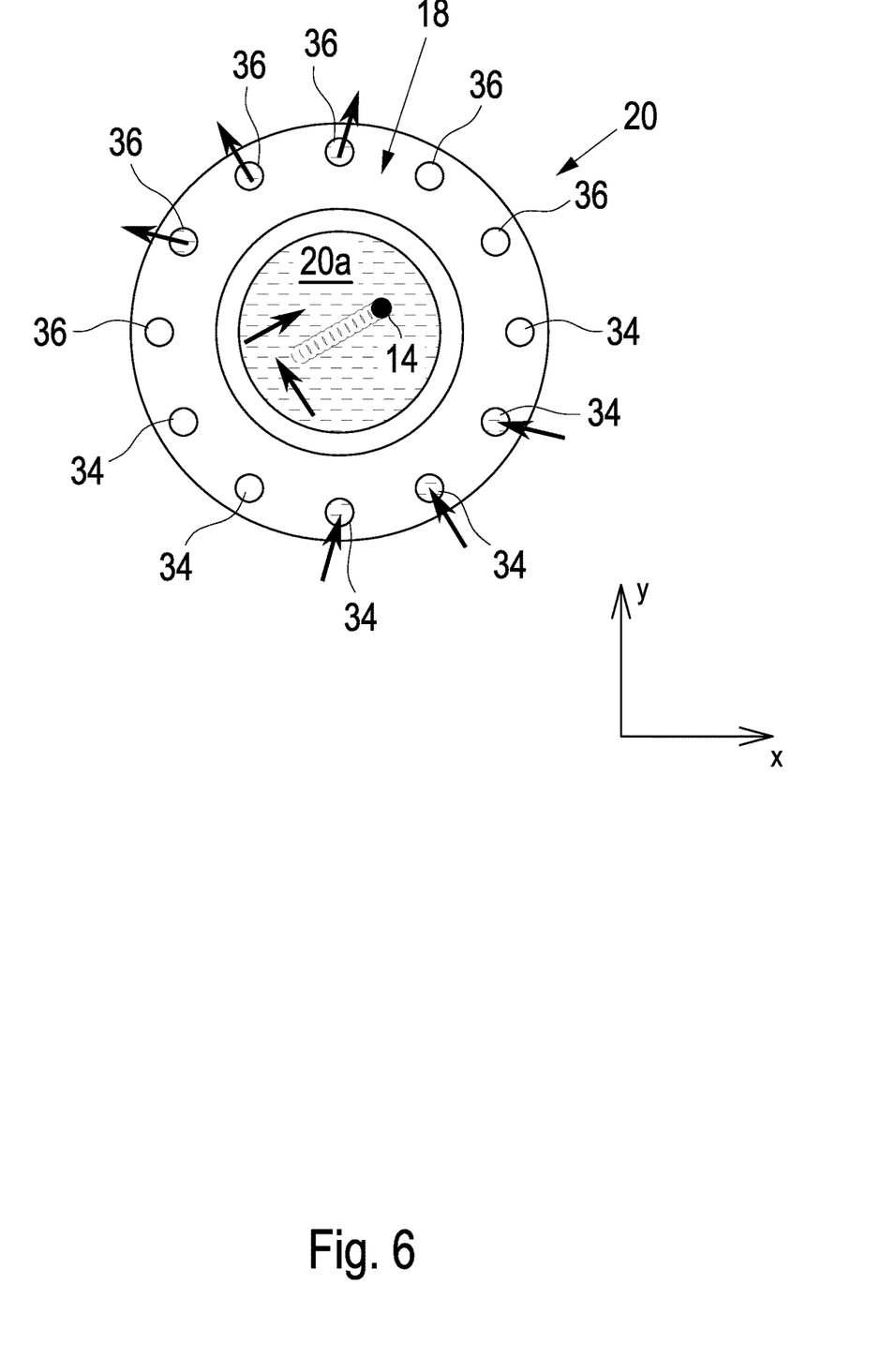
FIG. 6 shows a plan view of the process chamber illustrated in FIG. 4 in a second operating mode.

FIG. 6 shows a further plan view of process chamber 20 illustrated in FIG. 4. Here, it can be seen that in the writing mode illustrated here, the focused laser beam 14 is moved diagonally along the surface of the workpiece. In this writing mode, the flow direction is adjusted by now driving three pressure pumps so that liquid flows into interior 20a of process chamber 20 through three liquid inlet channels 34 in a flow direction oriented substantially orthogonally to the writing direction. In addition, three suction pumps are activated so that liquid is discharged from interior 20a of process chamber 20 in the three liquid outlet channels 36, which are opposite the active liquid inlet channels 34. In this way, a homogeneous flow is generated in interior 20a of process chamber 20, which flow is oriented orthogonally to the writing direction of the laser radiation. As shown in experimental tests, the processing quality, in particular the cutting quality, can be improved if a liquid flow direction is adjusted in interior 20a of process chamber 20 that is oriented orthogonally to the writing direction.

As already explained above, according to an embodiment of the present invention, it may also be provided that the flow generator comprises only two flow generator units configured to generate a flow in a first direction and to generate a flow in a second direction. For example, it may be provided that process chamber 20 includes a first flow generator unit configured to generate a liquid flow in the direction of the positive x-axis and a second flow generator unit configured to generate a liquid flow in the direction of the positive y-axis. In this way, respectively one flow can be adjusted in interior 20a of process chamber 20, which flow is orthogonal or as orthogonal as possible to the current writing direction. Thus, when the laser radiation is advanced in the direction of the x-axis, a liquid flow can be generated in the direction of the y-axis. When the laser radiation is advanced in the direction of the y-axis, a flow can be generated in the direction of the z-axis. If, on the other hand, the laser radiation is moved along an axis forming an angle <45° to the x-axis, a flow can be generated in the direction of the y-axis. If, on the other hand, the laser radiation is moved along an axis forming an angle of <45° to the y-axis, a flow can be generated in the direction of the x-axis. In this way, a flow can always be provided that is oriented as orthogonally as possible to the writing direction.

Figure 7:
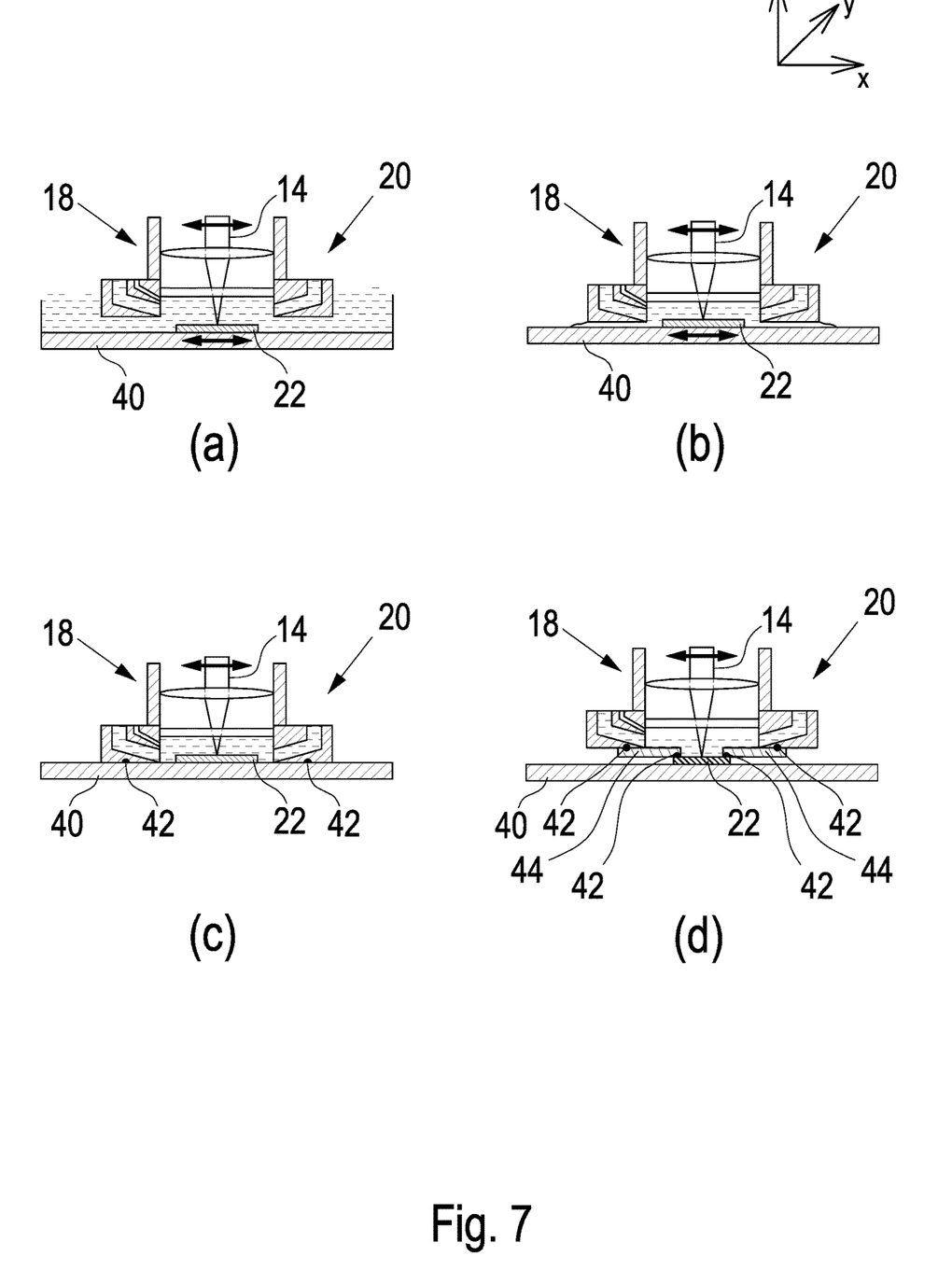
FIG. 7 shows different embodiments of the process chamber according to the invention.

Furthermore, FIG. 7 shows different embodiments of process chamber 20 according to the invention. In FIG. 7(a), process chamber 20 is adjusted to allow a relatively large amount of liquid to flow out at the second side 26 of process chamber 20. This can be realized, for example, by adjusting the position of process chamber 20 along the z-axis or by adjusting positioning table 40 along the z-axis. The relative distance between process chamber 20, which is of open design on the second side 26, and positioning table 40 determines how much liquid can escape at the second side 26. As already explained above, a relatively large distance between process chamber 20 and positioning table 40 may be advantageous if a particularly large amount of liquid is to flow through process chamber 20. This may be particularly the case if it is expected that a relatively high amount of particles will be generated during laser processing.

FIG. 7(b) illustrates another exemplary embodiment in which the distance between process chamber 20 and positioning table 40 is adjusted to allow relatively little liquid to escape at the second side 26 of process chamber 20. This may be particularly advantageous if it is expected that even low flow rates will be sufficient to remove the particles generated in interior 20a of process chamber 20 and any cavitation bubbles. The examples shown in FIGS. 7(a) and (b) illustrate that process chamber 20, which is of open design on the second side 26, offers the advantage over the prior art that workpieces of any size can be processed using one and the same process chamber 20. Although process chamber 20 is designed to be relatively small, workpieces having dimensions of several 10 cm or even larger than 1 m can be processed using this process chamber 20.

FIG. 7(c) shows a further exemplary embodiment of process chamber 20 according to the invention. In this exemplary embodiment, a sealing element 42 is also provided to prevent liquid from escaping from the second side 26 of process chamber 20. This makes it possible to keep liquid consumption low during the laser processing operation. In addition, the sealed process chamber 20 allows for simplified control over how much liquid is discharged from chamber 20.

In FIG. 7(d), process chamber 20 has additional cover elements 44 on its second side 26, which in this embodiment are designed as cover plates. The cover elements 44 serve to cover workpiece 22 such that only the area of the workpiece to be processed is exposed. On the one hand, this has the advantage that workpiece 22 only comes into contact with liquid at those area which are actually exposed to laser radiation 14 during the processing operation. This is particularly advantageous when using workpieces that show an undesirable interaction with the liquid used. Another advantage of using the cover elements 44 is that less liquid is required than in the embodiment shown in FIG. 7(c).

Figure 8:
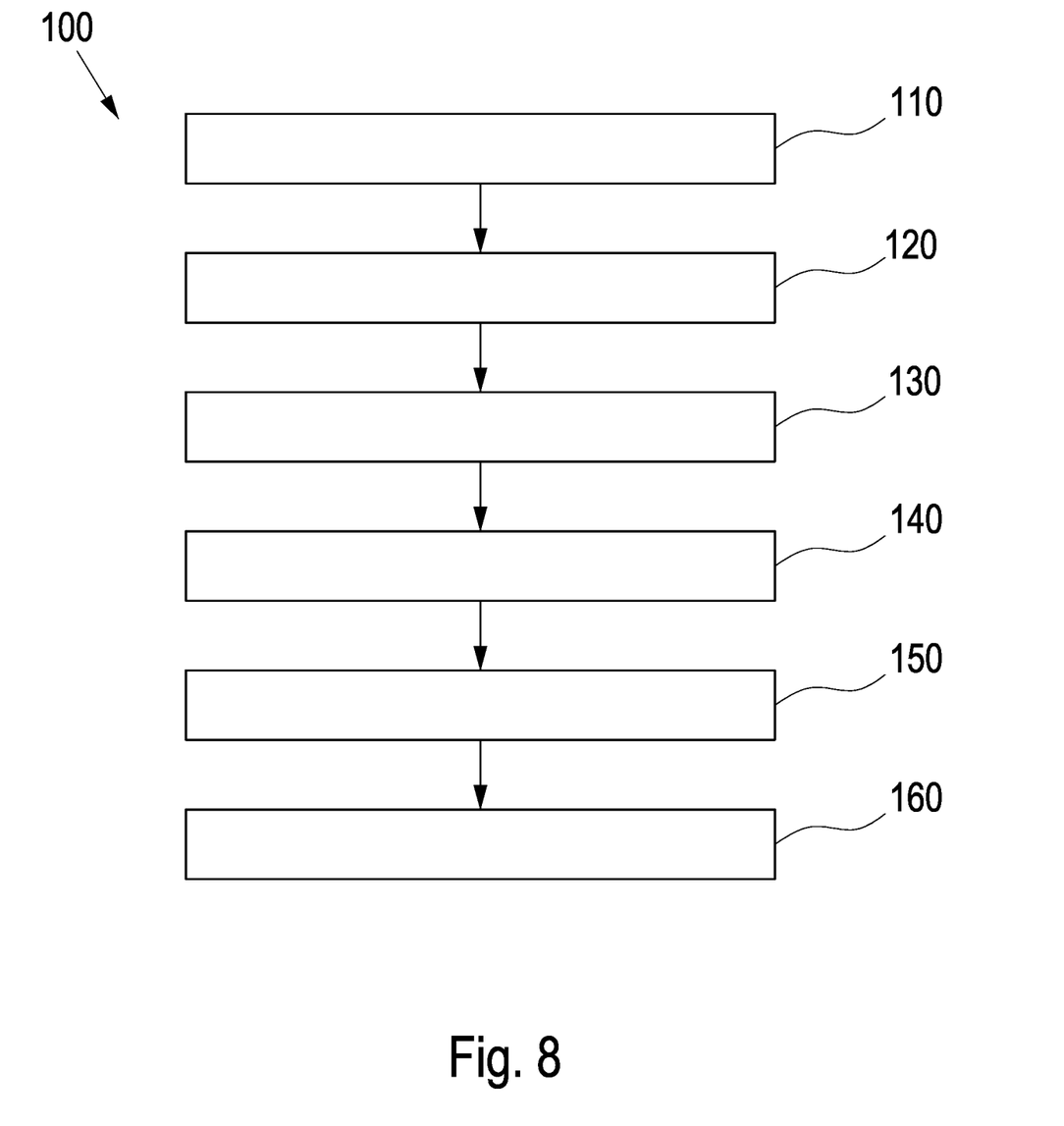
FIG. 8 shows a flow chart of the method according to the invention.

Finally, FIG. 8 shows an exemplary embodiment of method 100 according to the invention for the laser processing of workpieces in liquid. In method 100, which is illustrated here, in a first step 110, a workpiece is provided in an interior of a process chamber 20. For example, the process chamber 20 may be formed according to the exemplary embodiments shown in FIG. 7. In a second step 120, the interior of the process chamber is filled with a liquid. The liquid can be water or other liquids. In a subsequent step 130, a pulsed laser radiation is focused on a surface of the workpiece, using a focusing unit. Then, in step 140, a relative movement of the focused laser beam is generated on the surface of the workpiece, wherein a positioning unit is used for this purpose. The positioning unit can be configured either to change the absolute position of the laser beam or to vary the absolute position of the workpiece. In a further method step 150, a liquid flow within the interior of the process chamber is generated, wherein a flow generator is used. In particular, the flow generator can comprise a first flow generator unit and a second flow generator unit, each configured to generate a flow in a first direction and in a second direction. Finally, in a next method step 160, the flow direction of the liquid flow is adjusted depending on the relative direction of movement of the focused laser radiation on the surface of the workpiece. In particular, a flow direction orthogonal to the relative direction of movement of the laser radiation on the workpiece surface can be adjusted. This enables efficient removal of the particles and cavitation bubbles generated inside the chamber, significantly reducing the interference effects during laser processing and thereby improving the cutting quality achieved.

Even though the individual method steps have been described above in a fixed sequence for better understanding, it is obvious to the person skilled in the art that individual steps can also be carried out in a different sequence. For example, the liquid flow within the interior of the process chamber can be generated first, and only then can the pulsed laser radiation be focused on a surface of the workpiece.

Although the present invention has been particularly explained in connection with a laser cutting process, it is apparent to a person skilled in the art that the invention can also be used in other laser processing operations. In particular, the present invention is also applied in laser patterning of surfaces in liquid using pulsed laser radiation.

The present invention further comprises the following aspects:

1. A system for laser processing of workpieces in liquid, comprising
   a laser beam source for generating pulsed laser radiation;
   a focusing unit for focusing the laser radiation onto a workpiece;
   a process chamber for receiving a workpiece, the process chamber comprising:
   a first side having a transparent process window for letting pass laser radiation;
   a second side arranged opposite the first side;
   a chamber wall surrounding an interior of the process chamber; and
   a flow generator for generating a flow within the interior of the process chamber, the flow generator comprising a first flow generator unit for generating a first flow along a first flow axis and a second flow generator unit for generating a second flow along a second flow axis; and
   a positioning unit for adjusting the position of the laser radiation on the workpiece.
2. The system according to aspect 1, characterized in that the first flow axis and the second flow axis together form an angle of 80° to 100°, preferably between 85° and 95°, and particularly preferred of 90°.
3. The system according to aspect 1 or 2, characterized in that the first flow generator unit or the second flow generator unit comprises a suction pump and/or a pressure pump.
4. The system according to any one of the preceding aspects, characterized in that the first flow generator unit or the second flow generator unit comprises a suction pump and a pressure pump, wherein the suction pump is arranged on a side of the interior of the process chamber opposite the pressure pump and is particularly configured to discharge liquid from the interior of the process chamber at the same velocity as the liquid is introduced by the pressure pump.
5. The system according to any one of the preceding aspects, characterized in that the second side of the process chamber is of open design.
6. The system according to aspect 5, characterized in that the process chamber comprises a closing flap disposed at the second side and configured to transfer the process chamber from an open state to a closed state.
7. The system according to any one of aspects 1 to 4, characterized in that the second side of the process chamber is of closed design.
8. The system according to any one of the preceding aspects, characterized in that the positioning unit for adjusting the position of the laser radiation on the workpiece comprises a laser scanner for deflecting the laser radiation and/or a positioning table for positioning the workpiece, wherein the positioning table is particularly configured to position the workpiece in a horizontal plane and additionally in a vertical direction.
9. The system according to any one of the preceding aspects, characterized in that the focusing unit comprises a focusing lens, a microscope objective and/or a concave mirror.
10. The system according to any one of the preceding aspects, characterized in that the process chamber comprises a gas supply device and/or a gas discharge device.
11. The system according to any one of the preceding aspects, characterized in that the laser beam source for generating a pulsed laser radiation is configured to generate a pulsed laser radiation having a pulse duration of 10 fs to 300 ps, preferably of 100 fs to 200 ps.
12. The system according to any one of the preceding aspects, characterized by a spatial light modulator or diffractive optical element, wherein the spatial light modulator or diffractive optical element is configured to provide a plurality of laser beams for parallel laser processing of a workpiece.
13. The system according to any one of the preceding aspects, characterized by a camera system configured to make recordings of the interior of the process chamber.
14. A method for laser processing of workpieces in liquid, the method comprising the following steps:
    providing a workpiece in an interior of a process chamber;
    filling the interior of the process chamber with a liquid;
    focusing a pulsed laser radiation onto a surface of the workpiece using a focusing unit;
    generating a relative movement of the focused laser radiation on the workpiece surface using a positioning unit;
    generating a liquid flow within the interior of the process chamber using a flow generator;
    adjusting a flow direction of the liquid flow depending on the relative direction of movement of the focused laser radiation on the surface of the workpiece.
15. The method according to aspect 14, characterized in that adjusting the flow direction comprises adjusting a flow direction that is oriented orthogonally to the relative direction of movement of the laser radiation on the workpiece surface.

16. The method according to aspect 14 or 15, characterized in that the relative movement of the focused laser radiation along the surface of the workpiece takes place at a velocity of 0.6 to 1.4 mm/s, in particular 0.8 to 1.2 mm/s and particularly preferred 1 mm/s.

17. The method according to any one of aspects 14 to 16, characterized in that the flow velocity is 1 to 10 m/s, in particular 4 to 6 m/s, and particularly preferred 5 m/s.

18. The method according to any one of aspects 14 to 17, further characterized by the following steps:
   detecting the direction of relative movement of the laser radiation using a camera system; and
   adjusting a flow direction orthogonal to the detected direction of the relative movement of the laser radiation.

LIST OF REFERENCE NUMERALS 10 laser processing system
12 laser beam source
14 laser radiation
16. positioning unit
18 focusing unit
20 process chamber
20a interior of process chamber
22 workpiece
22a workpiece surface
24 first side of process chamber
26 second side of process chamber
28 process window
30 chamber wall
31 particle cloud
32 flow generator unit
34 liquid inlet channel
36 liquid outlet channel
38 gas inlet
40 positioning table
42 sealing element
44 cover element
100 method according to the invention for laser processing of a workpiece in liquid
110 first method step
120 second method step
130 third method step
140 fourth method step
150 fifth method step
160 sixth method step

The invention claimed is:

1. A system for material-ablative laser processing of workpieces in liquid, comprising
   a laser beam source for generating pulsed laser radiation;
   a focusing unit for focusing the laser radiation onto a workpiece;
   a process chamber for receiving a workpiece, the process chamber comprising:
      a first side having a transparent process window for transmitting the laser radiation;
      a second side arranged opposite the first side;
      a chamber wall surrounding an interior of the process chamber; and
      a flow generator for generating a flow within the interior of the process chamber, the flow generator comprising a first flow generator unit for generating a first flow along a first flow axis and a second flow generator unit for generating a second flow along a second flow axis; and
   a positioning unit for adjusting the position of the laser radiation on the workpiece, wherein the second side of the process chamber is open.

2. The system according to claim 1, wherein the first flow axis and the second flow axis together form an angle of 80° to 100°, preferably between 85° and 95°, and particularly preferred of 90°.

3. The system according to claim 1, wherein the first flow generator unit or the second flow generator unit comprises a suction pump and/or a pressure pump.

4. The system according to claim 1, wherein first flow generator unit or the second flow generator unit comprises a suction pump and a pressure pump, wherein the suction pump is arranged on a side of the interior of the process chamber opposite the pressure pump and is particularly configured to discharge liquid from the interior of the process chamber at the same velocity as the liquid is introduced by the pressure pump.

5. The system according to claim 1, wherein process chamber comprises a closing flap disposed at the second side and configured to transfer the process chamber from an open state to a closed state.

6. The system according to claim 1, wherein the positioning unit for adjusting the position of the laser radiation on the workpiece comprises a laser scanner for deflecting the laser radiation and/or a positioning table for positioning the workpiece, wherein the positioning table is particularly configured to position the workpiece in a horizontal plane and additionally in a vertical direction.

7. The system according to claim 1, wherein the focusing unit comprises a focusing lens, a microscope objective and/or a concave mirror.

8. The system according to claim 1, wherein the process chamber comprises a gas supply device and/or a gas discharge device.

9. The system according to claim 1, wherein the laser beam source for generating a pulsed laser radiation is configured to generate a pulsed laser radiation having a pulse duration of 10 fs to 300 ps, preferably of 100 fs to 200 ps.

10. The system according to claim 1, further comprising a spatial light modulator or diffractive optical element, wherein the spatial light modulator or diffractive optical element is configured to provide a plurality of laser beams for parallel laser processing of a workpiece.

11. The system according to claim 1, further comprising a camera system configured to make recordings of the interior of the process chamber.

12. A method for material-ablative laser processing of workpieces in liquid, the method comprising the following steps:
   providing a workpiece within an interior of a process chamber; or underneath the process chamber,
   the process chamber comprising:
      a first side having a transparent process window for transmitting the laser radiation;
      a second side arranged opposite the first side, wherein the second side of the process chamber is open;
      a chamber wall surrounding an interior of the process chamber;
   filling the interior of the process chamber with a liquid;
   focusing a pulsed laser radiation onto a surface of the workpiece using a focusing unit;
   generating a relative movement of the focused laser radiation on the workpiece surface using a positioning unit;

generating a liquid flow within the interior of the process chamber using a flow generator;

adjusting a flow direction of the liquid flow depending on the relative direction of movement of the focused laser radiation on the surface of the workpiece.

13. The method according to claim 12, wherein adjusting the flow direction comprises adjusting a flow direction that is oriented orthogonally to the relative direction of movement of the laser radiation on the workpiece surface.

14. The method according to claim 12, wherein the relative movement of the focused laser radiation along the surface of the workpiece takes place at a velocity of 0.6 to 1.4 mm/s, in particular 0.8 to 1.2 mm/s and particularly preferred 1 mm/s.

15. The method according to claim 12, wherein the flow velocity is 1 to 10 m/s, in particular 4 to 6 m/s, and particularly preferred 5 m/s.

16. The method according to claim 12, further comprising the following steps:

detecting the direction of relative movement of the laser radiation using a camera system; and adjusting a flow direction orthogonal to the detected direction of the relative movement of the laser radiation.

* * * * *